Aug. 28, 1923.

H. J. HASENBEIN

BAKING PAN

Filed July 22, 1922

1,466,095

Inventor
Harry J. Hasenbein
By Mason Fenwick & Lawrence
Attorneys

Patented Aug. 28, 1923.

1,466,095

UNITED STATES PATENT OFFICE.

HARRY J. HASENBEIN, OF FLUSHING, NEW YORK, ASSIGNOR TO JABURG BROS. INC., OF NEW YORK, N. Y.

BAKING PAN.

Application filed July 22, 1922. Serial No. 576,814.

*To all whom it may concern:*

Be it known that I, HARRY J. HASENBEIN, a citizen of the United States, residing at Flushing, L. I., in the county of Queens and State of New York, have invented certain new and useful Improvements in Baking Pans; and I do hereby declare the following to be a full, clear, and exact description of the invention, such as will enable others skilled in the art to which it appertains to make and use the same.

This invention relates to improvements in baking pans and has for its objects to provide means for clamping the edge of the tin of the pan; to prevent said edges from becoming exposed; to thus provide a pan free from sharp edges and which will remain so indefinitely; to provide improved means for bracing the pans and maintaining them in spaced and alined relation; to secure simplicity of construction and operation, and to obtain other advantages and results as may be brought out in the following description.

Referring to the accompanying drawings in which like numerals of reference indicate similar parts throughout the several views.

Figure 1:
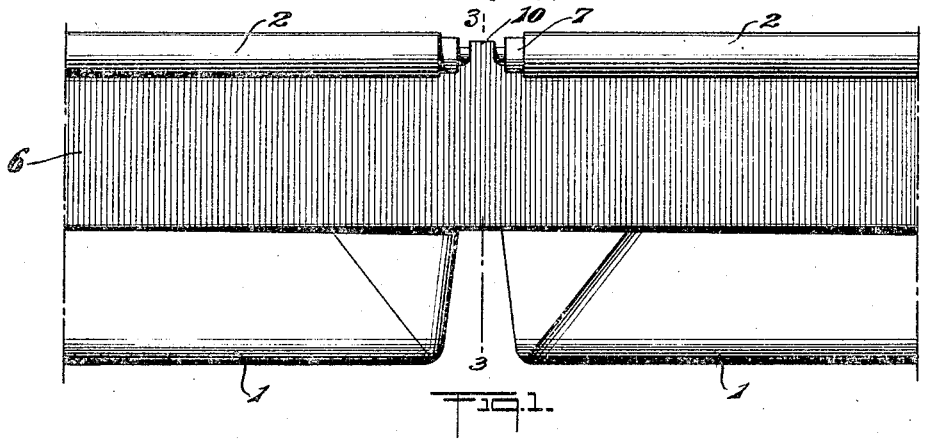
Figure 1 is a side elevation of a portion of two pans constructed in accordance with my invention.
Figure 2:
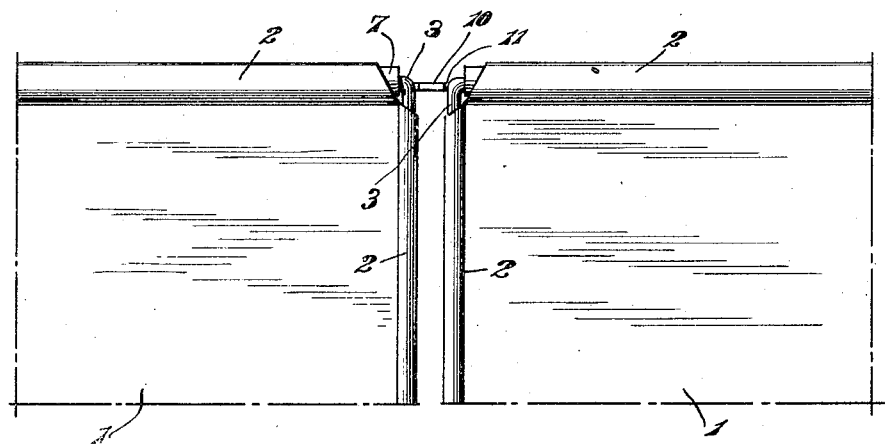
Figure 2 is a plan view of the same.
Figures 3, 4:
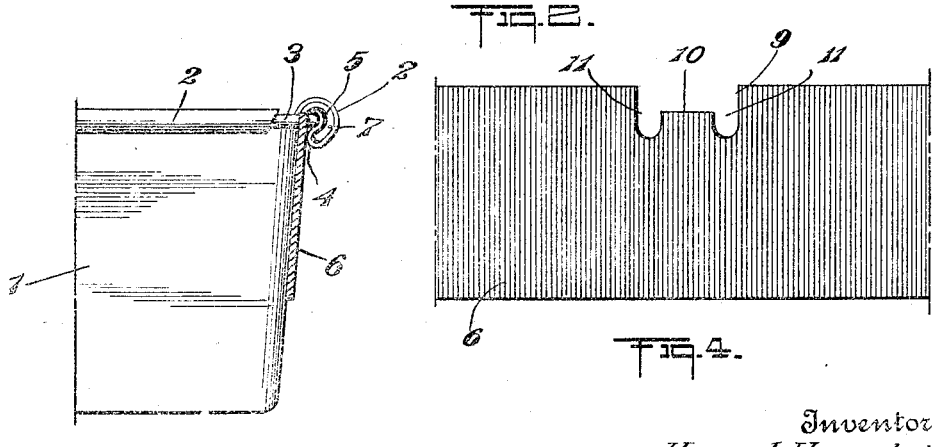
Figure 3 is a sectional view on line 3—3 of Fig. 1.
Figure 4 is a side elevation of a portion of a certain bracing and spacing strap.

In the specific embodiment of the invention illustrated in said drawing, the reference numeral 1 indicates in general a bread pan of which there may be one or more. This pan 1 is provided with a rolled upper margin 2, and it is a feature of the present invention to so roll the margin as to protect the edge of the metal so the same will not be liable to catch and unbend the roll or injure the user of the pan. Contained within the rolled margin 2 is a wire reinforcement 3, and the edge of the rolled margin is turned upwardly within the said roll as at 4 so that the extreme edge 5 is interposed between the wire 3 and the portion of the material forming the roll. Obviously the bent back portion 4 will form a smooth edge which will not readily catch nor injure the user, and the extreme edge 5 is fully protected within the roll. Since the extreme edge 5 is engaged between the material forming the roll and the wire 3, the same will be prevented from pulling out to a position where the edge might be easily caught.

Where the pans are to be used in multiple, it is customary to secure the same together by means of a strap extending along the ends of the several pans. In the present showing, I employ such a strap as indicated as at 6. Preferably the strap is made so that its upper edge will be included within the roll 2, and as clearly shown in Figure 3 the material forming the pan lies close against the said strap and where it has rolled over and turned the bent back portion 4 passes around the edge of said strap and thus the extreme edge 5 of the material of the pan is included between the wire 3 and the rolled portion 7 of the strap 6. The strap is of much heavier material than the material of the pan and will therefore grip the extreme edge 5 of the roll. In the manufacture of the pan and the assembly thereof, the roll is braced tightly against the wire so there is a positive grip upon the extreme edge 5 of the roller, and the frictional contact thus obtained is sufficient to permanently hold the material of the roll in place.

I also utilize this strap 6 as means for spacing and bracing the several pans. To accomplish this result, the strap is notched as at 9, the notch 9 having a central lip 10 from the bottom thereof which results in a depression 11 on each side of the lip 10. The parts are so proportioned that the depressions 11—11 will receive exposed portion of the wire 3, the lip 10 projecting upwardly between the said wires and thus spacing the pans apart. By bending the edge of the strap around the wire it will be seen that the wire is held firmly within the recess 11 and thus the pans are very rigidly supported or braced, and the lip 10 prevents the pans from sliding and thus maintains the same in proper spaced relation to each other.

Obviously detail changes and modifications may be made in the construction and use of my improved baking pan and I do not wish to be understood as limiting myself to the exact structure shown except as set forth in the following claim when construed in the light of the prior art.

Having thus described my invention, I claim:—

In a device of the character described, a strap for uniting a plurality of pans having wire reinforced edges, said strap being notched for receiving the wire and having a lip for extending between the wires and spacing the pans apart.

In testimony whereof I affix my signature.

HARRY J. HASENBEIN.